(12) United States Patent
Nayak

(10) Patent No.: US 7,007,015 B1
(45) Date of Patent: Feb. 28, 2006

(54) PRIORITIZED MERGING FOR FULL-TEXT INDEX ON RELATIONAL STORE

(75) Inventor: Tapas K. Nayak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 10/137,023

(22) Filed: May 1, 2002

(51) Int. Cl.
    G06F 17/30 (2006.01)
(52) U.S. Cl. .............. 707/4; 707/2; 707/3; 707/5; 707/7
(58) Field of Classification Search .............. 707/2, 707/4, 5, 7, 3, 100; 715/531
    See application file for complete search history.

(56) References Cited

U.S. PATENT DOCUMENTS

| | | | | |
|---|---|---|---|---|
| 5,168,565 A | * | 12/1992 | Morita | 707/3 |
| 5,852,826 A | * | 12/1998 | Graunke et al. | 707/7 |
| 6,094,649 A | * | 7/2000 | Bowen et al. | 707/3 |
| 6,128,613 A | * | 10/2000 | Wong et al. | 707/7 |
| 6,349,308 B1 | * | 2/2002 | Whang et al. | 707/103 Z |
| 6,385,611 B1 | * | 5/2002 | Cardona | 707/6 |
| 6,609,123 B1 | * | 8/2003 | Cazemier et al. | 707/4 |
| 6,618,720 B1 | * | 9/2003 | On Au et al. | 707/2 |
| 6,665,666 B1 | * | 12/2003 | Brown et al. | 707/5 |

OTHER PUBLICATIONS

Golovchinsky, G., "What the Query Told the Link: The Integration of Hypertext and Information Retrieval," *Eighth ACM Conference on Hypertext, Hypertext '97*, 1997, Southampton, UK, 67-74.

Jennings, R., "SQL Server 2000 Gains on Oracle," *Visual Basic Programmer's Journal*, 2000, 10(11), 20-9.

* cited by examiner

*Primary Examiner*—Cam-Y Truong
(74) *Attorney, Agent, or Firm*—Woodcock Washburn LLP

(57) ABSTRACT

A full-text search index system and method is generated by creating instances of a database index from an in-memory inverted list of keywords associated with a text identifier and the occurrences of the keyword in the text. Instances of the index are placed in a priority queue. A merge scheduling process determines when a merge should be initiated, selects instances of the index to be merged and selects a type of merge to perform.

13 Claims, 10 Drawing Sheets

Ft Index

| |
|---|
| Keyword 802 |
| PropertyId 804 |
| DocIdList 806 |
| DocCount 808 |
| DocIDMin 810 |
| DocIdMax 812 |
| OCCListList 814 |
| OCCCountList 816 |

FIG. 8

PRIORITIZED MERGING FOR FULL-TEXT INDEX ON RELATIONAL STORE

FIELD OF THE INVENTION

This invention relates generally to the field of computing and in particular to full-text indexing in a database environment.

BACKGROUND

Full-text searching of unstructured and semi-structured data is becoming more and more important in the world of computing. For many years, the information-retrieval community has had to deal with the storage of documents and with the retrieval of documents based on one or more keywords. Since the burgeoning of the World Wide Web, and the feasibility of storing documents on-line, retrieval of documents based on keywords has become a thorny problem. A number of software solutions have been developed, such as those available from Hummingbird Software and IBM (e.g., LOTUS NOTES), which have attempted to address some of these problems.

A large portion of digitally stored information is presently stored in the form of unstructured textual data, both in plain text files and in formatted documents. Although the bulk of this textual data is stored in file systems, there are advantages to storing such data in relational databases. By doing so, the advantages of a database, including high-performance access, query capability, simple application-based user interfaces for end users, and secure remote access, are made available.

Relational Databases

Database management systems (DBMSs) such as Oracle and SQL Server are widely used to search structured data. It is impractical, however, to search unstructured data (e.g., text documents) the same way structured data is searched because doing so is too expensive.

For example, in order to retrieve information from structured data in a database, a user typically provides a query (written in a query language such as SQL), where the query specifies the structured information to be retrieved (the search term or terms), the field in which the search term is to be found and the manner in which the retrieved information is to be manipulated or evaluated in order to provide a useful result. To process the query, the database system typically converts the query into a relational expression that describes algebraically the result specified by the query. The relational expression is used to produce an execution plan, which describes particular steps to be taken by a computer to produce the requested result. Because the search term and the field where the search term is sought are specified, such results can be returned quickly. Indexes based on key fields, (e.g., an index based on name or social security number for a personnel database), routinely assist in efficient searching.

A similarly-conducted search for the same search term in unstructured data would require a word-by-word search of the entire text database and is unworkable.

Typically, today, an inverted index for searching documents is created by building a custom data structure external to the database system before a search query is entered. These solutions usually involve pulling data out of the database via bridges or gateways and storing the data as files in the file system so that textual indexing can be applied. Some systems actually store index data in a database but use an external engine to build and query the index. This approach does not provide a seamless way for a user to combine a textual query with a regular structured relational query and limits the extent to which a query can be optimized.

Typically, a full-text index is organized as a tree where internal nodes represent keywords and whose external nodes contain document identifiers and occurrences. When searched, the keyword(s) are looked up in the index and the documents containing the keyword(s) are retrieved. Naturally, whenever the collection of documents changes, a new index must be built or the existing index must be updated.

Although full text searching is frequently a capability of database management systems, the implementation of full-text search is typically unable to take advantage of the features of the database management system, which is to say, relational database management systems generally are unable to accommodate full-text searching of documents within the structure of the database. Typically, the index created to search the document database is not itself part of the database system (i.e., is separate from the database's index system). Because the index created is not part of the database system, certain limitations arise and certain highly advantageous aspects of database systems do not apply to typical full-text search systems.

Limitations associated with a full-text search system that relies on an external index include the following:

Integration with existing database search technologies like Microsoft's SQL SERVER is fairly complex and difficult because the index is a custom index, and typically has its own transactional mechanism and storage mechanism. A significant amount of custom code, therefore, is needed for indexing, querying and administration.

Enhancements to existing or newly added systems that require a change in persistent storage format is difficult because changes in the storage management code of the custom index is required.

Implementation of scaling features such as the distribution of workload and files among multiple resources including clustering, etc., requires a significant amount of development.

Replication, i.e., keeping distributed databases synchronized by copying the entire database or subsets of the database to other servers in the network, is typically of the unsophisticated "full copy and propagate" form with very loose integrity semantics. A more efficient form of replication would require a significant amount of development.

Incorporation of database features such as query caching, keyword buffering, data partitioning etc. is more difficult since any such work frequently impacts the core engine code and sometimes impacts persistent store layout.

Upgrading from one file structure to another is a difficult development task.

A significant amount of code must be maintained to perform a function which is very similar to a function already performed by, for example, a cluster index associated with a relational database system such as SQL Server.

Query optimization cannot be tightly integrated.

Similarly, some of the advantages of database management systems are not applicable to a full-text search system based on a custom index. For example, most database systems have excellent facilities for data recovery in the event of database degradation, however, these data recovery systems do not work for the index file because the index file is not a DBMS data store. Hence data corruption can be a frequent problem with a file system index file. If there is a hardware malfunction it is very difficult to efficiently reach a point where the documents database and the documents index are in sync because the two different systems have different protocols.

Backup and restore mechanisms for the index file generally do not have the advanced features typically available for database files, as discussed above.

Scalability issues exist for the index file. Scalability refers to partitioning one logical table into multiple physical tables on the same machine or on different machines in order to accommodate very large collections of data. For example, instead of storing a large database on a single resource, it is frequently desirable to split or partition the database across a number of resources. Database data stores generally maintain data in tables that can reside locally on a single data store or can be distributed among several data stores in a distributed database environment.

Advantages to partitioning are the reduction of processing load on a single resource, faster access to data and if a particular machine experiences a hardware failure, only part of the data is lost. Partitioning, however, is typically not available for a file system index file, because partitioning a file system file requires a separate infrastructure. Thus, typically the index file, although frequently very large, cannot be partitioned, so a single resource must be dedicated to the index.

Hence, a need exists in the art to provide a full-text searching system wherein the index is built upon standard database technology.

SUMMARY OF THE INVENTION

A full-text indexing system and method is built using standard database technology, (e.g., the Microsoft SQL SERVER storage and query engine). An inverted list is generated comprising keywords contained in data, (e.g., text), an identifier associated with the data and the occurrence(s) of the keyword in the list. An instance of a database index (part of the DBMS indexing system) is created and stored in a priority queue. A scheduling process determines when instances of the index are to be merged. Instances are prioritized by number of rows (keywords) and size. One of three types of merges is selected and the instances are merged.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 8 is a representation of a database structure for a full text index data store in accordance with one embodiment of the invention;

DETAILED DESCRIPTION OF THE INVENTION

Exemplary Computing Environment

Figure 1:
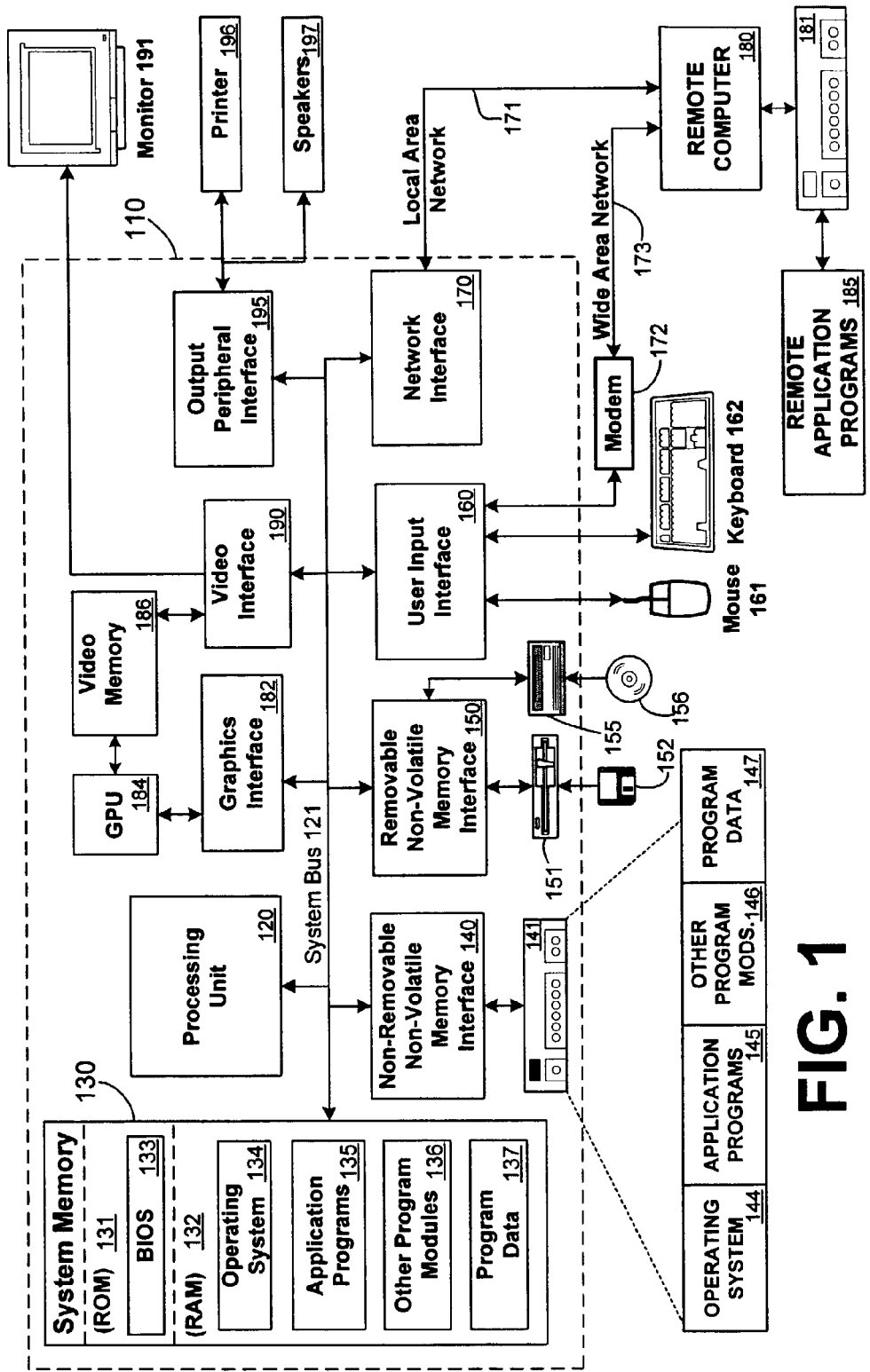
FIG. 1 is a block diagram of an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. A graphics interface 182, such as Northbridge, may also be connected to the system bus 121.

Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Full-Text Indexing System

Figure 2:
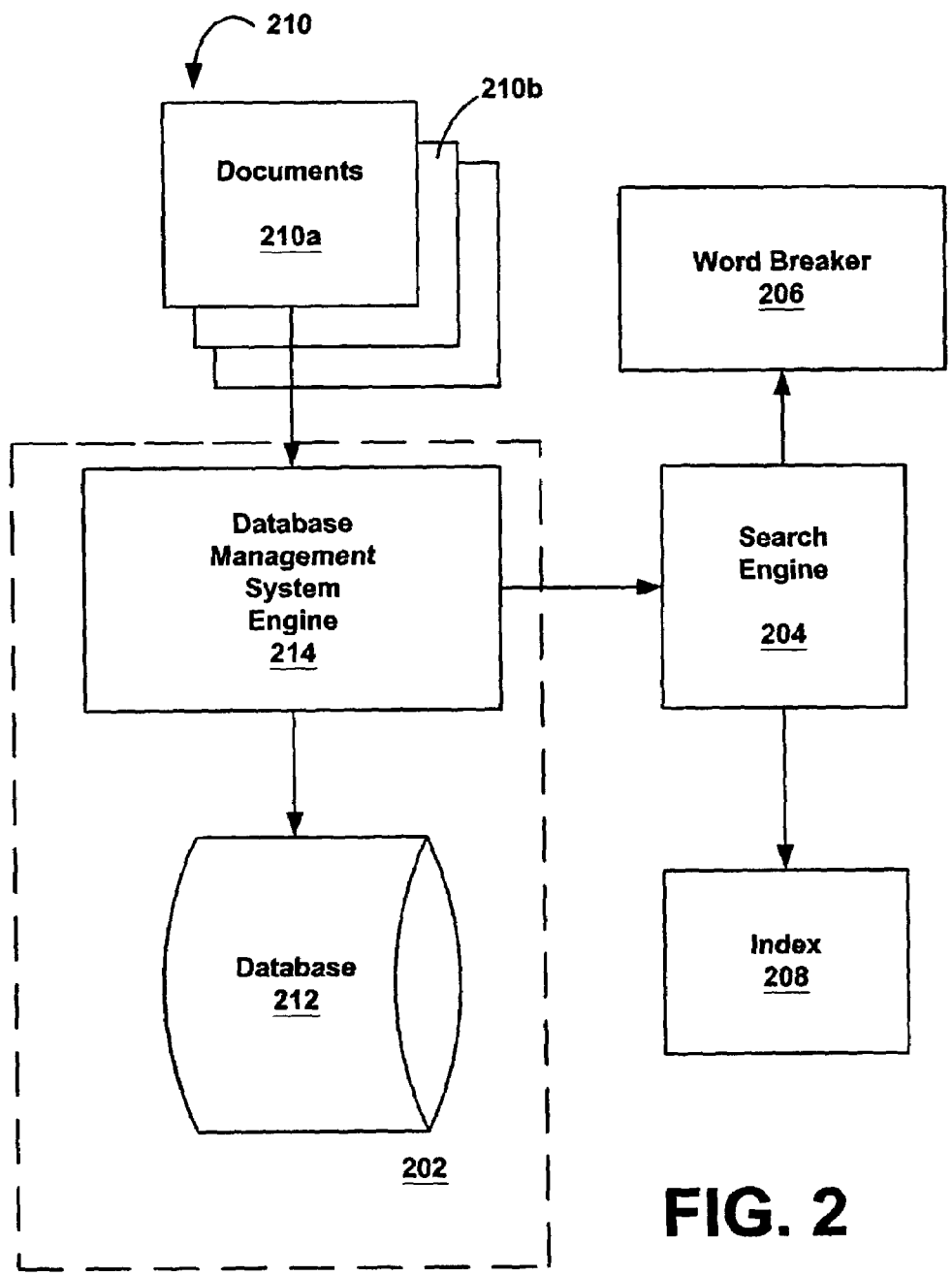
FIG. 2 is a block diagram of a full-text search indexing system as is known in the art.

Full-text search indexing systems utilizing an external index may be implemented as shown in FIG. 2. Typically a group of documents 210 includes individual documents 210a, 210b, etc., one or more of which may be loaded into a database basetable of a DBMS 202. In general, a document 210a is loaded into the columns of a row in the basetable, one document per column. The database system 202, including database management system engine 214 and data stores (databases) 212, typically associates document 210a with a unique document identifier (called herein full-text key) which is used to identify the row in the basetable that contains the document. The text of document 210a is provided to word breaker 206 by search engine 204. Word breaker 206 determines which words of the text of document 210a should be keywords (also known as tokens). Word breaker 206 also determines the location(s) of the keyword in the document, as a number representing byte offset from the beginning of the document. In other words, if word breaker 206 determines that a key word of document 210a is "innovation" and the word "innovation" is the first, fourteenth and twenty-fifth word in document 210a, the word breaker 206 would typically return the keyword "innovation" and the byte offsets at which the first, fourteenth and twenty-fifth words are located, to search engine 204. An index 208 of tokens or keywords is generated by an external executable such as a search engine 204. For each keyword associated with the text of document 210a, an entry in index 208 would be created, typically containing the keyword and the occurrences of the keyword in document 210a for each keyword in document 210a.

Figure 3:
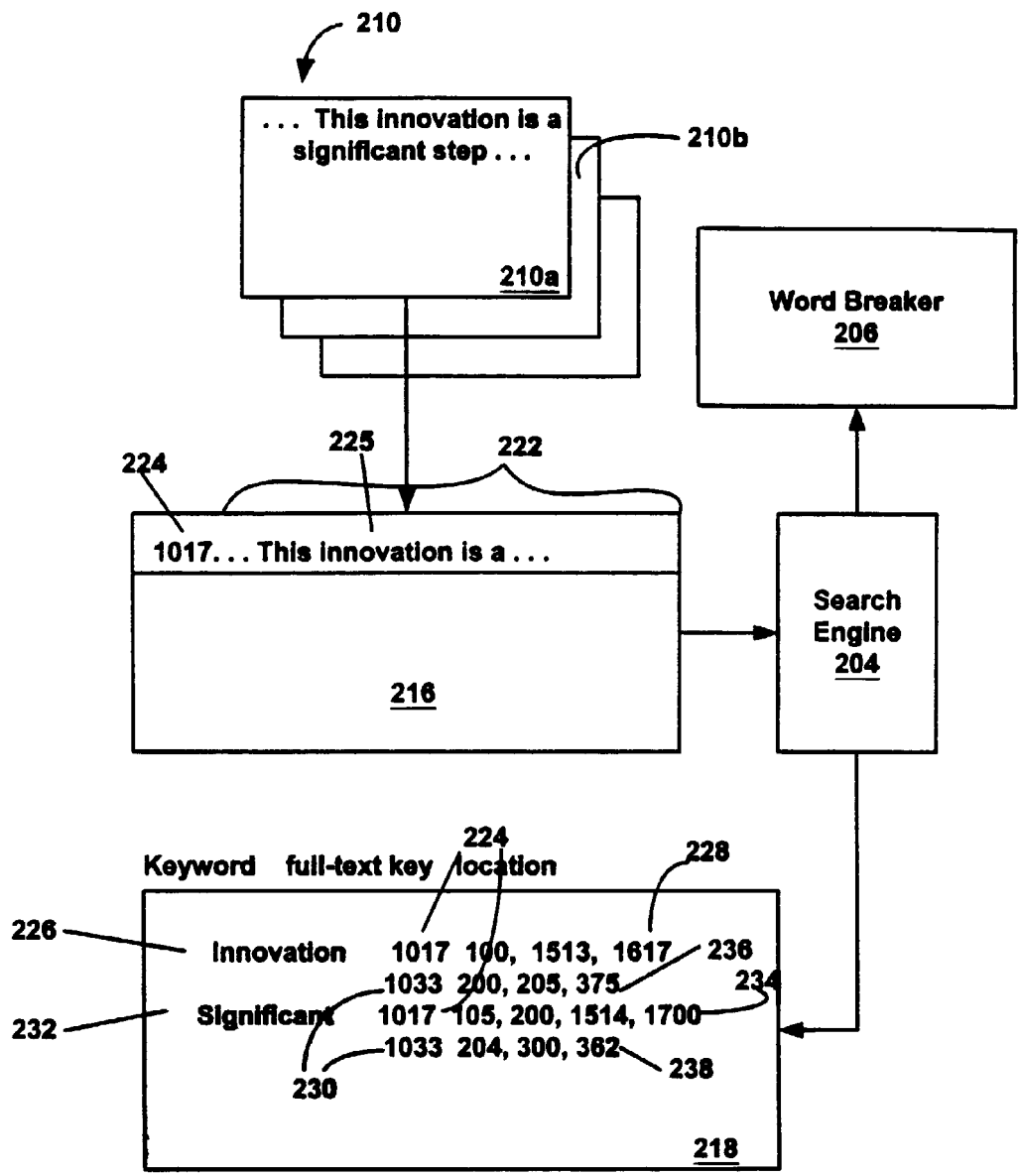
FIG. 3 is a block diagram of a portion of the full-text search indexing system of FIG. 2, as is known in the art.

For example, and referring now to FIG. 3, suppose a document 210a of a collection of documents 210, including document 210a, 210b, etc., is loaded into a database basetable 216. Document 210a is assigned a full-text key by the database management system 202. For example, database management system 202 may assign document 210a the full-text key "1017" 224. The full-text key assigned by the database management system 202 typically is alphanumeric and can be rather large. Assume document 210a full-text key 1017 224 contains the text "This innovation is a significant step towards search and indexing technology." 225 somewhere within the document. When full-text key 1017 224 is loaded into basetable 216, "This innovation is a significant step towards search and indexing technology" is loaded into basetable 216 of database management system 202. The words "This innovation is a significant step towards search and indexing technology", for example, might be loaded into word locations 99 through 110 of a row in the content field 222 of basetable 216.

External search engine 204 may retrieve data associated with full-text key 1017 224 from basetable 216 and send this data to word breaker 206. Typically a word breaker 206 would be invoked to pick out the keywords or tokens from the text of document 210a. In the example, word breaker 206 has determined that the keywords contained in document 210a include "innovation" and "significant".

Word breaker 206 also typically determines the byte offset from the beginning of the document at which the keywords (also referred to as "tokens") are found. For example, word breaker 206 may determine that "innovation" can be found in document 210a at byte offsets 237587100, 446861513 and 687771617, and that "significant" can be found in document 210a at byte offsets 237587778, 687888200, 687888514 and 852531700. This information may be passed back to search engine 204.

Search engine 204 typically uses this information to create index 218 and may convert byte offset to word offset. In the example described above, index 218 would contain keyword "innovation" 226 followed by full-text key 1017 224 followed by the locations (word offset) 228 at which "innovation" can be found in the document, (i.e., 100, 1513, 1617). Suppose another document 210b (assigned a full-text key of "1033") also contains the word "innovation" at word locations 200, 205 and 375. The index 218 in this case would contain an entry for full-text key 1033 230 followed by the locations 236 at which "innovation" can be found (i.e., 200, 205, 375) in full-text key 1033. Similar entries 234, 238 for keyword "significant" would also be generated for full-text key 1017 and full-text key 1033 (234, 238). Thus a file system index typically is created containing keywords, full-text keys for documents containing each keyword and the locations within each document containing the keyword specifying the location by word offset of the keyword in that document.

A user querying the database might ask, for example, for all the documents containing the words "innovation" located near the word "significant". Depending on the specific query form, a table of results might be returned, listing the document numbers containing the words "innovation" located near "significant". Additionally, a "rank" for each document is also typically returned, where the rank is based on some proprietary formula, (such as, ranked by number of times the word(s) appeared in the document, whether the requested word(s) appeared in the title of the document, etc.). Rank typically reflects the relevance of the document to the search query.

Index 218 is typically a structure built on the file system and is not a database file and therefore is subject to the limitations in recoverability, reliability, management and scalability described above.

Full-text Indexing on Relational Store

Figure 4:
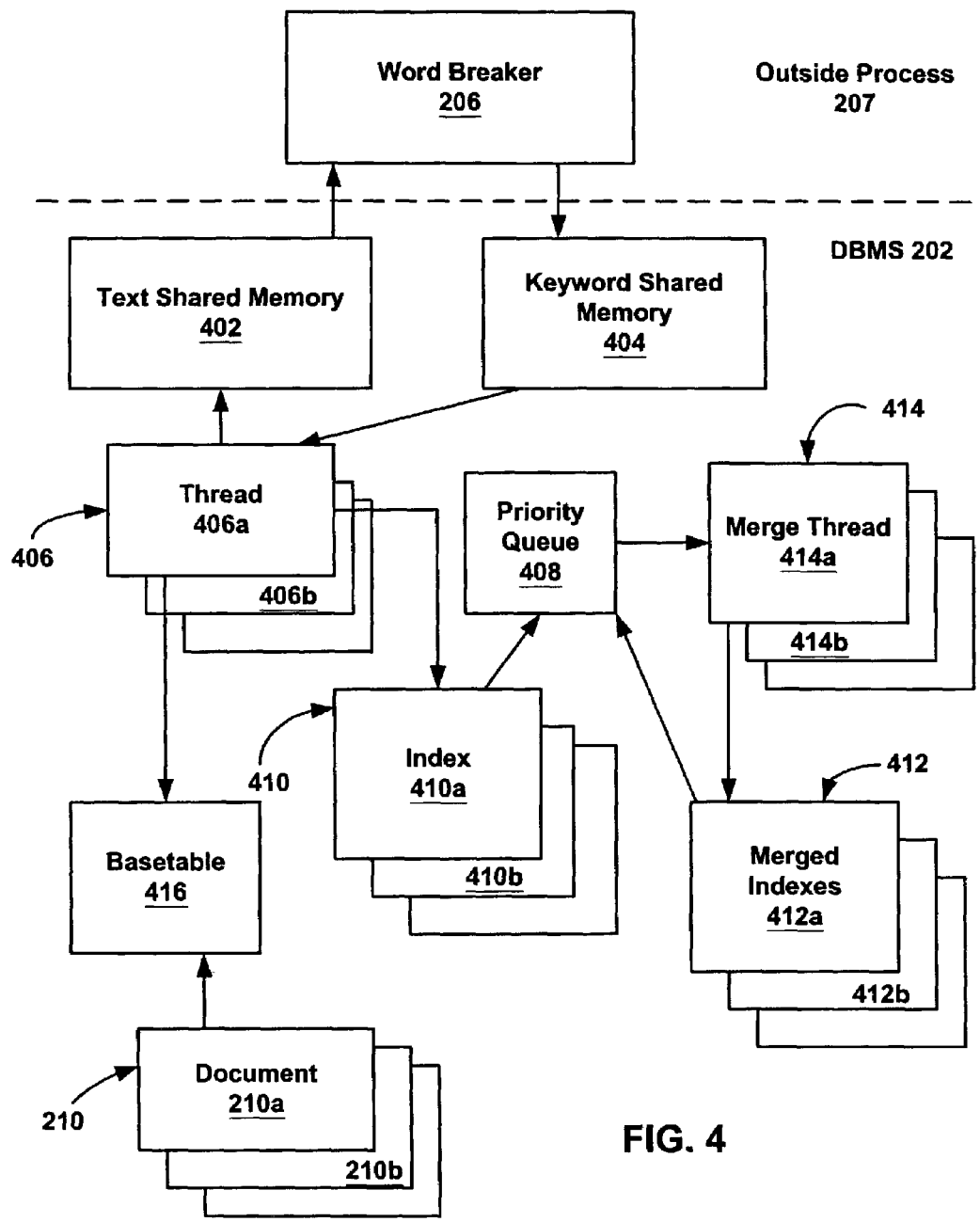
FIG. 4 is a block diagram of a full-text search indexing system in accordance with one embodiment of the invention.

FIG. 4 illustrates a full-text indexing system built on a relational store in accordance with one embodiment of the invention. Referring now to FIG. 4, document set 210, comprising a plurality of documents 210*a*, 210*b*, etc. is loaded into basetable 416 of DBMS 202. Alternatively, the document set 210 may exist as file system files. Thread pool 406 preferably contains a plurality of processing threads, 406*a*, 406*b*, etc. and can access basetable 416. Text shared memory 402 preferably can be accessed by both word breaker 206 (preferably, an outside process 207) and the threads comprising threadpool 406. Keyword shared memory 404 preferably can be accessed by both word breaker 206 and the threads of threadpool 406. Threads 406*a*, 406*b* etc. generate instances of index 410, including 410*a*, 410*b*, etc. Instances 410*a*, 410*b*, etc. of index 410 are put in priority queue 408 and are merged by merge threads 414*a*, 414*b*, etc. of merge thread pool 414 to generate merged index 412. Merged index 412 may include multiple index instances 412*a*, 412*b*, etc. Merged indexes are placed into priority queue 408.

Figure 5:
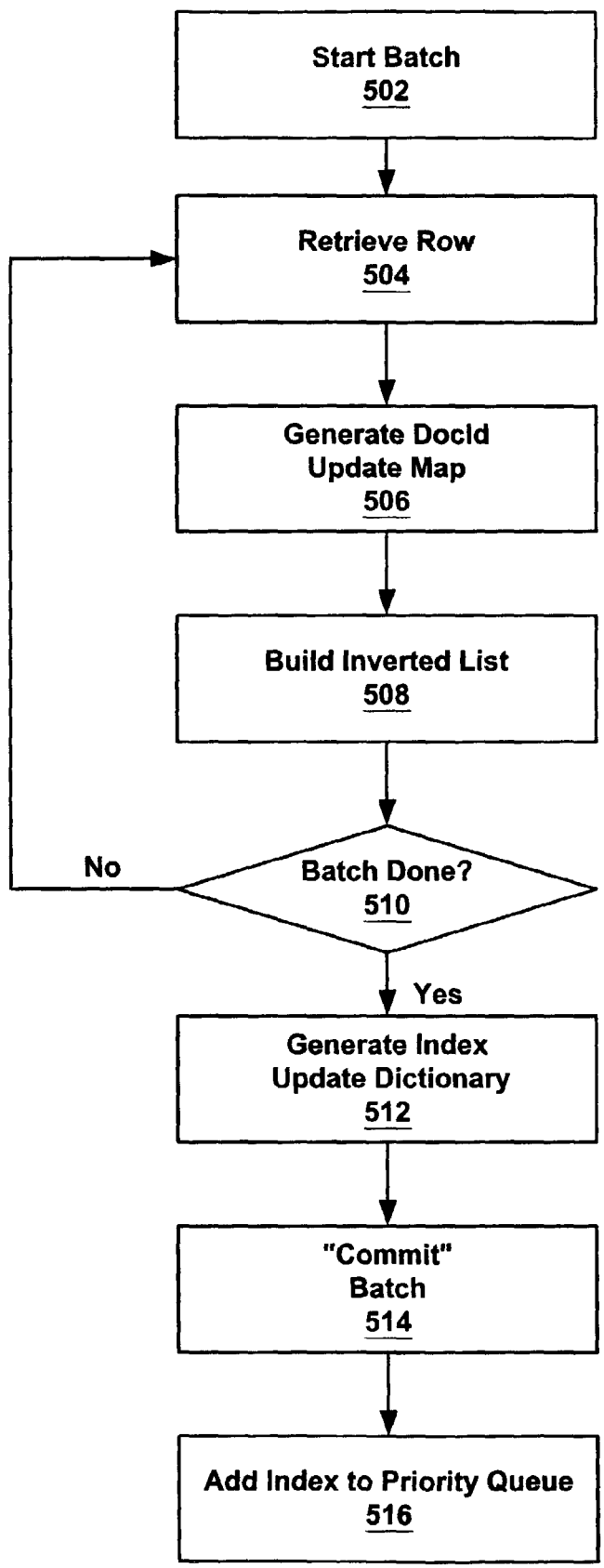
FIG. 5 is a flow diagram of a portion of a full-text search indexing method in accordance with one embodiment of the invention.

FIG. 5 is a flow diagram of a full-text search indexing method in accordance with one embodiment of the invention. Threads 406*a*, 406*b*, etc. from thread pool 406 represent separate activities and process separate batch transactions. Preferably these separate threads can be processed in parallel. FIG. 5 represents the process each thread 406*a*, 406*b* performs when it processes a batch of document rows. An instance of index 410, represented by 410*a*, 410*b*, etc. is generated by each batch as rows from basetable 416 are crawled by the separate processing threads.

At step 502, a new batch scan transaction is begun. Each batch begins with a new transaction. At step 504, a row of data is retrieved from basetable 416. A thread from thread pool 406 scans basetable 416 and stores data (i.e., text) from a row of basetable 416 in text shared memory 402. For example, thread 406*a* may scan row 1 of basetable 416, storing the row in chunks in shared text memory 402 at some location in the shared memory associated with thread 406*a*.

At step 506 a unique numeric document identifier, (referred to as DocId henceforth), is generated, which preferably translates a (sometimes) large full-text key that is not necessarily numeric in nature to a compact numerical identifier, called herein "DocId". For example, full-text key 1017 may be translated to DocId "1" and full-text key 1033 may be translated to DocId "2". A table that maps full-text keys to DocIds is maintained, preferably keyed on full-text key. As each row is crawled, the new unique DocId generated is stored as well in text shared memory 402.

Text shared memory 402 preferably can be accessed by word breaker 206. As the rows are crawled, the full-text columns stored in shared memory 402 are parsed by filters and word breakers, collectively represented by reference numeral 206 of FIG. 4. Filters typically are modules that parse formatted documents, (e.g., WORD documents or POWERPOINT documents) and emit chunks of text to be parsed by word breaker 206.

Word breaker 206 may retrieve, for example, the data contained in row 1 of basetable 416 stored in shared text memory 402, and determine which of the words in the document are keywords. For each of the words determined by word breaker 206 to be a keyword, the location(s) of that keyword in the document is determined. Word breaker 206 writes the keyword and occurrence information for each DocId to keyword shared memory 404.

At step 508, a thread (e.g., thread 406*a*) picks up the keyword, the DocId and the occurrences of the keyword from keyword shared memory and inserts them into an inverted list, called herein InvertedList, associated with the batch.

InvertedList preferably is a short in-memory list of keywords and keyword occurrences. An inverted list is generated for the batch of documents processed by the thread, transaction by transaction. Alternatively, more than one inverted list is generated per batch of documents.

Figure 6:
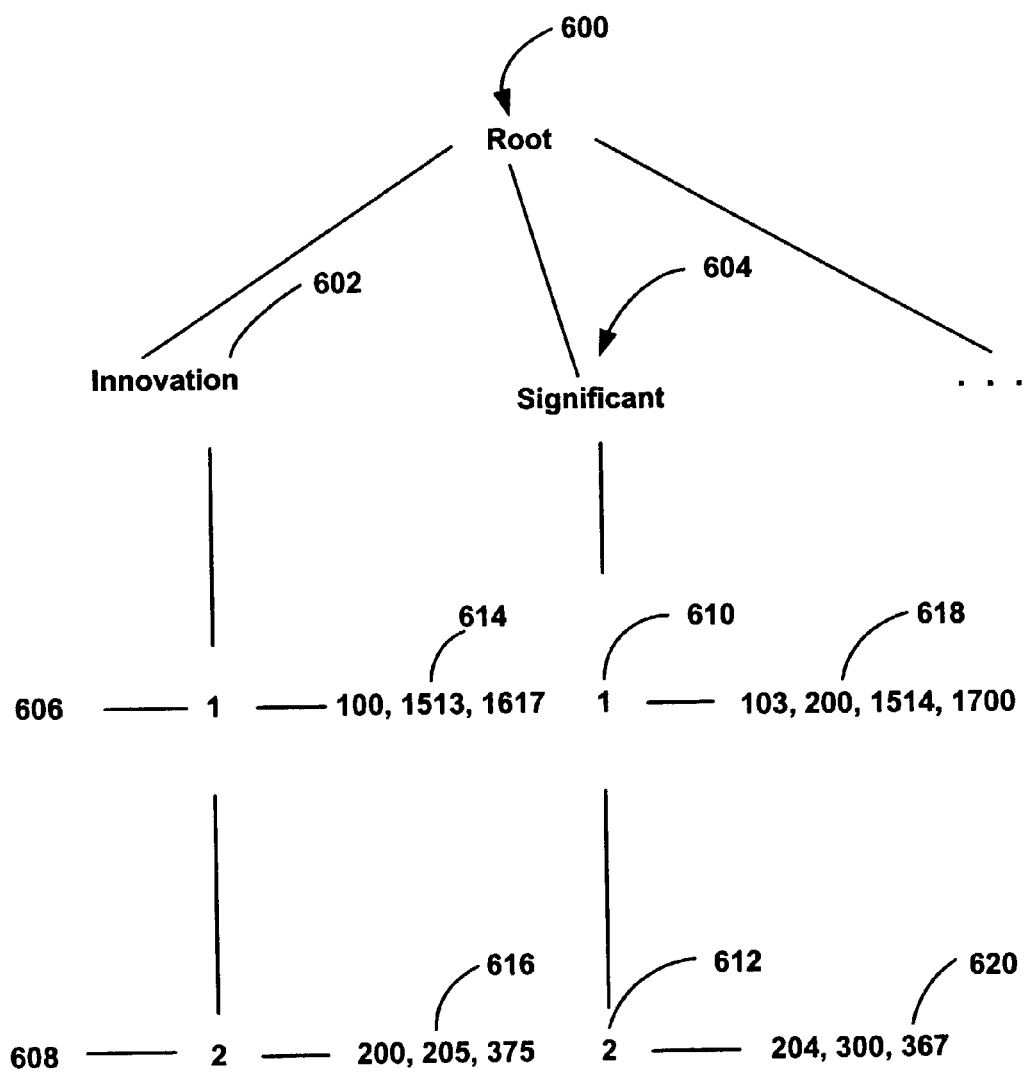
FIG. 6 is block diagram of a tree data structure implementation of one aspect of the invention, the shared memory InvertedList.

InvertedList, as illustrated by FIG. 6, is preferably implemented as an in-memory balanced tree, 600 of keywords 602, 604, etc. found in the documents processed in the batch. In one embodiment, for each keyword, a heap of DocIds 606, 608 and 610, 612 containing that keyword is maintained. For each DocId 606, 608 and 610, 612 in the heap, a sorted list of locations 614, 616 and 618, 620 (word position, preferably implemented as word offset, which is the same as the basetable 216 word location) is maintained, where the respective keyword appears in the document. This information is preferably stored in local memory (not shown) associated with thread 406*a*.

Figure 7:
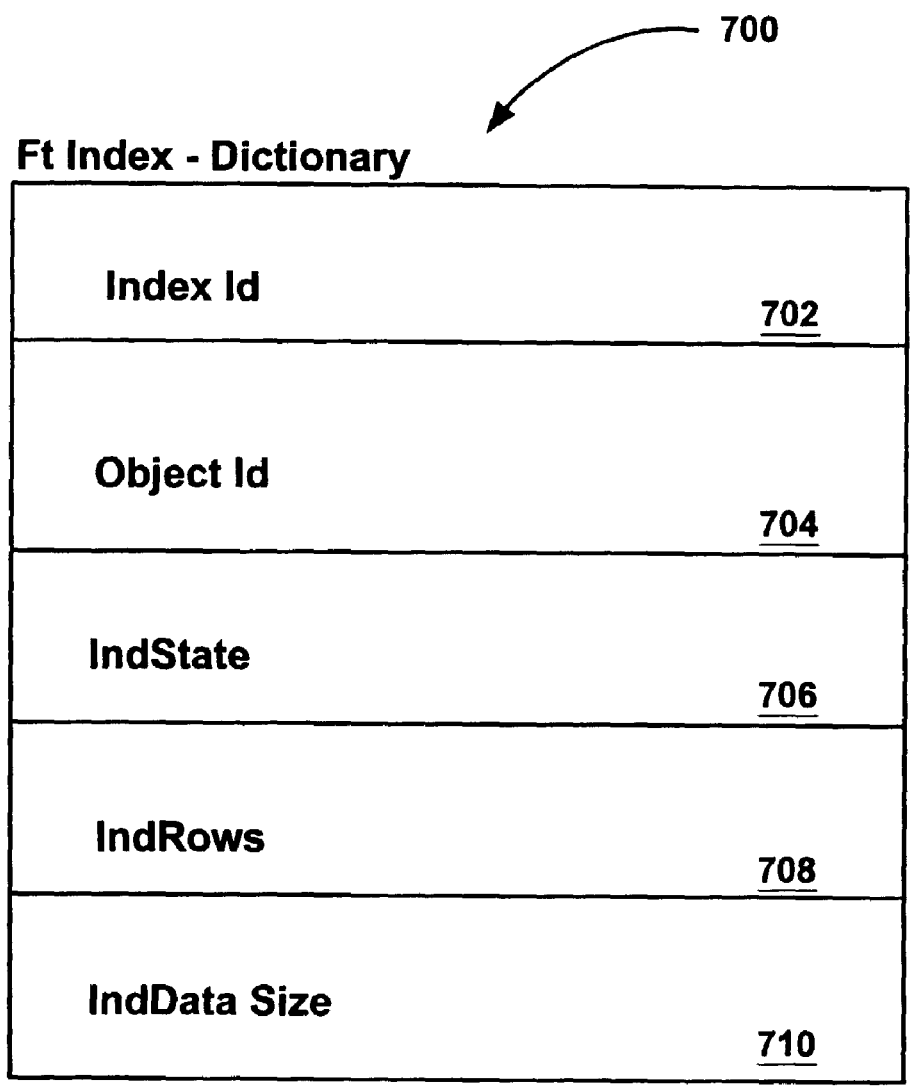
FIG. 7 is a representation of a database structure for a full text index dictionary in accordance with one embodiment of the invention.

Rows from the basetable 416 are processed until it is determined that the batch is complete (step 510). Batches may be determined to be complete because the available memory space is waning (amount of free memory has reached some configurable parameter) or when some configurable parameter representing a number of documents processed has been reached. When the batch is complete, at step 512, thread 406*a* creates an instance of index 410, (e.g., index 410*a*). Index 410 is a standard database table, (e.g., a SQL B-tree). A database table containing meta-data about instances of index 410 is also updated. In the example, the meta-data table is updated to reflect index instance 410*a*. This table is called herein FtIndex_Dictionary. The relevant structure of an exemplary FtIndex_Dictionary is depicted in FIG. 7, (i.e., FtIndex_Dictionary may include additional entries).

Elements of FtIndex_Dictionary 700 preferably include:

IndexId 702: a unique identifier for an instance of FtIndex,

ObjectId 704: a table identifier for the instance of FtIndex, created by the DBMS, IndState 706: a state indicator for the instance of FtIndex. Possible values for IndState include StateNew, StateOpen, StateClosed and StateInMerge. IndState for the index instance is set to StateNew when the index object is created but is not yet used. IndState for the index instance is set to StateOpen when the index is in use but does not yet contain any committed data. IndState for the index instance is set to StateClosed when the index instance contains committed data and processing is complete. IndState for the index instance is set to StateInMerge when the index instance is being merged with other indexes.

IndRows 708: number of rows in the index (a count of keywords inserted)

IndDataSize 710: an estimate (approximate) size of the instance of the index.

After the inverted list is persisted into an instance of an index and DocIdMap has been updated for the batch of rows processed by the thread, the batch is committed (e.g., SQL commit) at step 514. The 2-part commit transaction ascertains that all locks and resources are acquired and then performs the disk writes. The commit transaction guarantees that no document in a batch is partially committed. If all locks and resources are not acquired, the database changes are entirely backed out. As soon as an instance of an index is committed the index is queryable.

FIG. 8 illustrates the physical schema of an instance of an index fragment (FtIndex 800) in accordance with one embodiment of the invention.

Keyword 802 represents a normalized keyword from the document as determined by word breaker 206. Preferably Keyword 802 is a variable-length binary of maximum length 132 bytes. Keyword preferably is normalized for case and diacritical marks, based on a user's configuration. PropertyId 804 represents the column id of an attribute such as Title, Author, Content, etc. DocIdList 806 is a list of DocIds in which Keyword 802 appears. Preferably, the list of DocIds is compressed bit-wise as a BLOB, a Binary Large Object (i.e., a collection of binary data stored as a single entity). DocCount 808 is the number of documents containing the keyword, DocIdMin 810 is the smallest DocId stored in DocIdList 806. DocIdMax 812 is the largest DocId stored in DocIdList 806. OccListList 814 is a list of occurrence lists, one occurrence list for each DocId in DocIdList 806. OccCountList 816 is the number of occurrences in the corresponding occurrence lists for corresponding DocIds. Index fragments are indexed by a cluster index on (Keyword 802, PropertyId 804 and DocIdMin 810).

An InvertedList is persisted by inserting one or more rows for each keyword in InvertedList into a new instance of FtIndex. DocIdList 806 is generated by compressing sorted DocIds from InvertedList into a binary stream. Occurrences of the keyword from InvertedList are also compressed into a binary stream for each DocId containing the keyword. Occurrence lists of two consecutive DocIds stored in OccListList 814 are preferably separated by a sentinel in the compressed stream to delimit the end of one occurrence list from the beginning of the next occurrence list. When the InvertedList is persisted into an instance of FtIndex and FtIndex is committed, the state of that instance of FtIndex becomes StateClosed. The number of DocIdList BLOBs stored in a row in an instance of FtIndex is preferably limited by a parameter. At step 516, the instance of FtIndex is added to priority queue 408.

Merging

Periodically, instances of index 410 (e.g., FtIndex) are merged into fewer instances. Merging instances of the index improves query performance because fewer indexes have to be checked when a query is processed. Merging instances into fewer instances also optimizes the amount of storage and memory required because data repeated in index instances is eliminated (e.g., FtIndex_A and FtIndex_B may both contain the keyword "innovation" so that two rows (one in FtIndex_A and one in FtIndex_B) can be combined into one row in FtIndex_X). Finally, the number of I/O (input/output) operations is reduced because when the merged index is rewritten, related data is physically located closer together.

Figure 9:
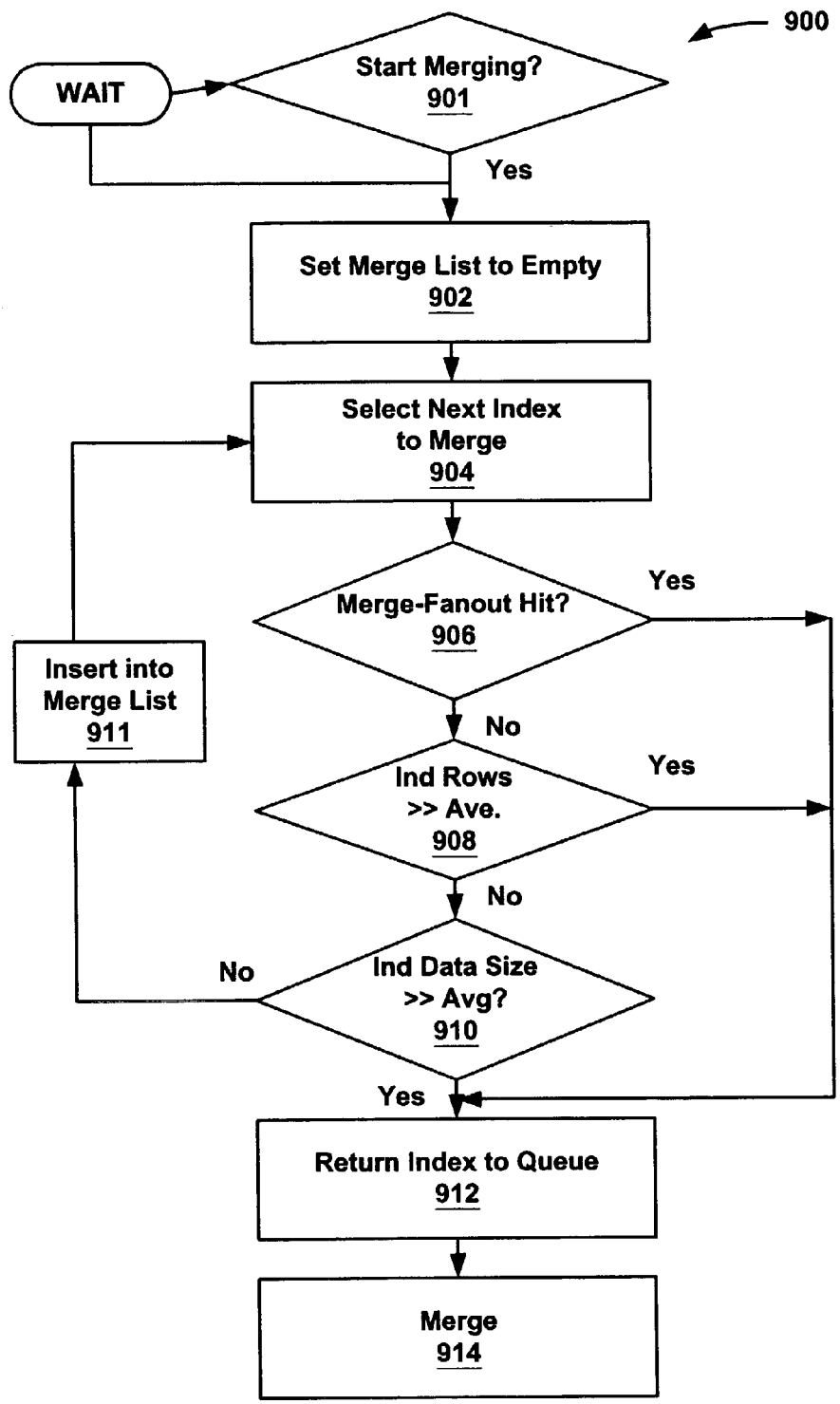
FIG. 9 is a flow diagram of a method for scheduling and selecting indexes to merge in accordance with one embodiment of the invention.

FIG. 9 illustrates a method 900 for selecting when to merge persisted indexes and also which indexes and how many indexes to select to merge. In general, it is desirable to merge as many indexes as possible in one merge so that the same data is not merged and merged again and merged again and so on, etc. On the other hand, in general, it is desirable to have as few open (unmerged) indexes as possible so that queries will have to check fewer indexes. For example, if there are 1000 indexes and a query is received, all 1000 indexes will have to be loaded into memory, and all 1000 indexes will have to be checked, necessitating a seek through each of the 1000 indexes. After a merge is performed, (perhaps all 1000 indexes have been merged into one index), typically, disk space requirements are reduced because redundant information is reduced, (the one merged index takes less space than the 1000 unmerged indexes), and the number of I/O (input/output) operations required are reduced because a fewer number of indexes exist (a seek is done on one index instead of on 1000 indexes). Typically as well, when the merged index is created, the keyword, document identification data and occurrences data are rewritten so that this information is located physically closer together, reducing access time. One embodiment of the invention balances the amount of query overhead that results from the existence of a large number of indexes with the amount of processing resources required to merge indexes. A soft configurable parameter called herein OpenIndexes determines when a desirable number of open (unmerged) indexes has been exceeded and influences when a merge is initiated. At step 901, a merge is initiated. At step 902, a list of indexes selected to merge (called herein MergeList) is initialized to "empty".

It is desirable to merge indexes of approximately the same size for efficiency considerations. The priority queue of indexes is preferably implemented as a heap data structure having the sort order: (IndRows, IndDataSize) so that the smallest index in that order is located at the top of the heap. Hence, as indexes are selected from the priority queue in step 904 for merging, indexes containing less data are selected before those containing more data. It will be appreciated that an alternative to sorting in ascending order and selecting from the top of the queue is sorting in descending order and selecting from the bottom of the queue. At step 904 an index is selected to merge. Indexes are pulled from priority queue 406 until any of the following conditions occur. It should be understood that the order of the steps 906, 908 and 910 has been selected for exemplary purposes only and in practice any ordering or combination of these steps may be implemented by the conceived invention. A counter, called herein SelectedIndexCounter, that tracks the number of indexes selected to merge, is incremented. In one embodiment of the invention, a configurable parameter referred to herein as MergeFanout determines the preferred number of indexes to be merged in one merge. At step 906, SelectedIndexCounter is compared to MergeFanout. If MergeFanout is reached or exceeded, processing continues at step 912. If MergeFanout is not reached, processing continues at step 908.

It is desirable to merge indexes of approximately the same size; however, even indexes of the same overall size may merge inefficiently. For example, FtIndex_001 and FtIndex_002 may be approximately the same size but FtIndex_001 may have a small number of keywords (rows) with a large number of associated DocIds and associated data while FtIndex_002 may have a larger number of keywords (rows) with a smaller number of documents associated therewith. Alternatively, FtIndex_001 and FtIndex_002 may have approximately the same number of unique keys (rows) but FtIndex_001 may reflect the indexing of far more documents than does FtIndex_002. Hence, steps 908 and 910 are performed. At step 908 IndRows 708 for the selected index is compared to the average number of rows in the other selected indexes. If IndRows 708 for the selected index is much greater than the average, processing continues at step 912. If not, processing continues at step 910. At step 910, IndDataSize for the last index selected is compared to the average IndDataSize of the other selected indexes. If IndDataSize for the last index selected is much greater than the average, processing continues at step 912. If IndDataSize for the last index selected is not much greater than the average, processing continues at step 911 in which the index is added to MergeList and the next index is selected from the merge queue (step 904).

Figure 10A:
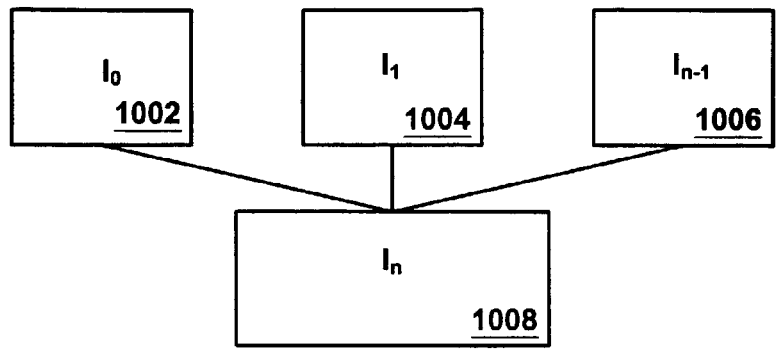
FIG. 10a is a block diagram of one type of merge in accordance with one embodiment of the invention.

At step 912, the last selected index is returned to the priority queue and processing continues at step 904. At step 914, the selected indexes (in MergeList) are merged. Merging preferably can occur in one of three ways. FIG. 10a illustrates a first merge strategy in accordance with one aspect of the invention. In MergeOutOfPlace, indexes selected from the priority queue 408 (represented by exemplary indexes $I_0$ 1002, $I_1$ 1004, ... $I_{n-i}$ 1006) are merged in the order of (Keyword, PropertyId) to form a merged DocIdList, OccListList and OccCountList and the merged rows are inserted into a new index (e.g., In 1008). This type of merge is preferably performed when most of the rows need to be updated. MergeOutOfPlace is typically very fast because a bulk insert can be performed.

Figure 10B:
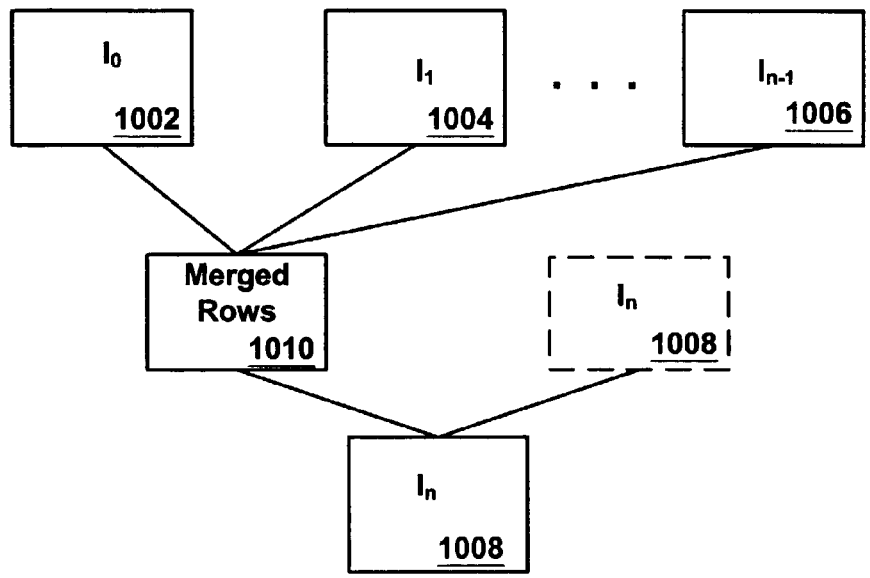
FIG. 10b is a block diagram of another type of merge in accordance with one embodiment of the invention.

FIG. 10b illustrates a second merge strategy in accordance with one aspect of the invention. In InsertMerge, rows from all indexes (e.g., $I_0$ 1002, $I_1$ 1004, ... $I_{n-1}$ 1006, $I_n$ 1008) except the last index selected (In 1008) are merged in (Keyword, Property Id) order into MergedRows 1010 and the merged rows to form a merged DocIdList, OccListList and OccCountList and the merged rows (rows from $I_0$ 1002, $I_1$ 1004, ... $I_{n-1}$ 1006) are inserted into the last index, $I_n$ 1008. InsertMerge is preferably performed when there are few keywords that need to be inserted into the index.

Figure 10C:
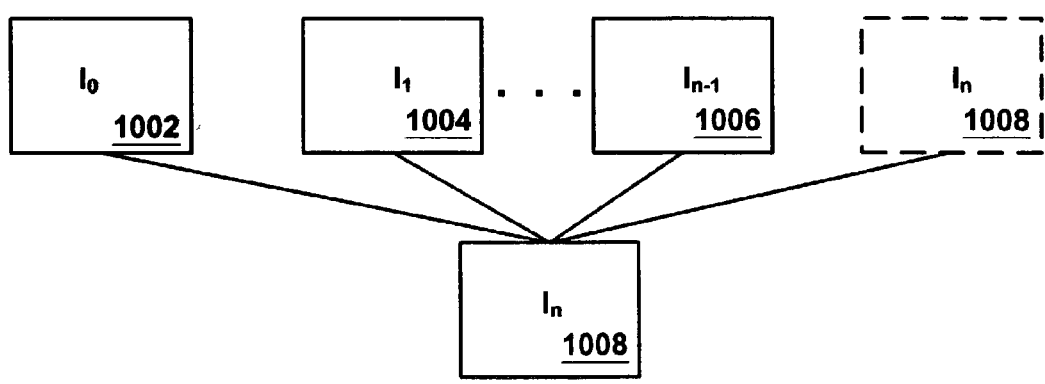
FIG. 10c is a block diagram of a third type of merge in accordance with one embodiment of the invention.

FIG. 10c illustrates a third merge strategy in accordance with one aspect of the invention. In MergeInPlace all the rows from all the indexes (i.e., $I_0$ 1002, $I_1$ 1004, ... $I_{n-1}$ 1006, $I_n$ 1008) are merged in the order of (Keyword, PropertyId) to form a merged DocIdList, OccListList and OccCountList and the merged rows are inserted back into the last index selected, (i.e., $I_n$ 1008). If a row from the last index, (i.e., $I_n$ 1008), does not need to be merged with any other row from the other indexes (i.e., $I_0$ 1002, $I_1$ 1004, ... $I_{n-1}$ 1006), then no changes are made to that row. If a merge is required with one or more rows from the other indexes, then the original rows participating in merger from the last index are deleted and the merged row is inserted. MergeInPlace is preferable when there are many keywords to be inserted but MergeOutOfPlace is not feasible because of resource (e.g. disk space) limitations.

What is claimed is:

1. A method of full-text searching of a database, the method comprising:
   providing data to be indexed for the full-text searching;
   creating inverted lists in memory from a keyword memory by database management threads, the keyword memory accessed by a word breaker external to a database management system and by a database management system thread, wherein each inverted list comprises at least one of a plurality of keywords in the data, an identifier associated with the data and at least one occurrence of the at least one keyword in the data;
   generating instances of an index based on the data, the index comprising part of a database indexing system of the database management system, the instances of the index generated from the inverted lists;
   storing the instances of the index in a priority queue, wherein each instance is assigned a priority based on a number of keywords of the instance and a size of the instance;
   scheduling a merge to be run on the instances of the index based on query load and merge load;
   selecting instances to be merged based on the assigned priorities of the instances; and
   merging the selected instances based on a selected type of merge to generate an instance of the index.

2. The method of claim 1, wherein the instances of the index are a first instance and a second instance;
   merging the first instance and the second instance to generate a third instance of the index.

3. The method of claim 1, wherein the database management system is Structured Query Language (SQL) Server.

4. The method of claim 1, wherein scheduling a merge to be run is based on balancing query processing load and merge processing load.

5. The method of claim 4, wherein the balancing of query processing load and merge processing load is based on a comparison of a number of indexes in the priority queue and a configurable parameter representing a preferred number of indexes for the priority queue to contain.

6. The method of claim 1, wherein selecting at least two of a plurality of instances of the index in the priority queue comprises sorting the plurality of instances of the index in the priority queue in an order of increasing number of keywords in the index.

7. The method of claim 6, further comprising sorting the instances of the index in the priority queue into increasing order of size of the instance.

8. The method of claim 1, wherein selecting a type of merge to be performed comprises selecting one of a merge-in-place, a merge-out-of-place and an insert merge.

9. The method of claim 8, wherein a merge-in-place comprises merging all rows of selected instances of the index into a last selected instance of the index.

10. The method of claim 8, wherein a merge-out-of-place comprises merging all selected instances of the index into a new instance of the index.

11. A system for generating a full text search index integrated within a database management system comprising:
    a processing thread pool comprising at least one of a plurality of processing threads of the database management system, the processing threads creating instances of the full text search index from inverted lists;
    a memory for storing the inverted lists, the memory accessed by a word breaker external to the database management system and the database management system processing threads;
    each inverted list comprising at least one of a plurality of keywords contained in data, an identifier associated with the data and at least one occurrence of the at least one keyword in the data;
    a priority queue for storing and prioritizing the instances of the full text search index, wherein each instance is assigned a priority based on a number of rows of the instance and a size of the instance;
    a merging thread pool comprising at least one of a plurality of merge threads, the at least one merge thread determining when a merge is scheduled, selecting, based on the assigned priorities of the instances, a plurality of instances from the priority queue, determining a type of merge to perform on the selected instances, and merging the selected instances based on the determined type of merge to generate an instance of the index.

12. The system of claim 11, wherein the database management system is SQL Server.

13. A computer-readable medium for full-text searching of a database comprising computer-executable instructions for:

providing data to be indexed for the full-text searching;

creating inverted lists in memory from a keyword memory, the keyword memory accessed by a word breaker external to a database management system and by a database management system thread, each inverted list comprising at least one of a plurality of keywords contained in the data, an identifier associated with the data and at least one occurrence of the at least one keyword in the data;

creating instances of an index based on the inverted lists, the index comprising part of a database indexing system of the database management system;

placing the instances of the index in a priority queue for processing, wherein each instance is assigned a priority based on a number of rows of the instance and a size of the instance;

selecting for merge a plurality of instances of the index from the priority queue based on the assigned priorities of the instances;

scheduling a merge to be run on the selected instances based on consideration of query load and merge load; and merging the selected instances based on a selected type of merge to generate an instance of the index.

* * * * *

UNITED STATES PATENT AND TRADEMARK OFFICE
CERTIFICATE OF CORRECTION

| | | |
|---|---|---|
| PATENT NO. | : 7,007,015 B1 | Page 1 of 2 |
| APPLICATION NO. | : 10/137023 | |
| DATED | : February 28, 2006 | |
| INVENTOR(S) | : Tapas K. Nayak | |

It is certified that error appears in the above-identified patent and that said Letters Patent is hereby corrected as shown below:

In column 8, line 17, after "indexing technology" delete ".".

In column 8, line(s) 33-41, delete "Word breaker 206 also typically determines the byte offset from the beginning of the document at which the keywords (also referred to as "tokens") are found. For example, word breaker 206 may determine that "innovation" can be found in document 210a at byte offsets 237587100, 446861513 and 687771617, and that "significant" can be found in document 210a at byte offsets 237587778, 687888200, 687888514 and 852531700. This information may be passed back to search engine 204." and insert -- Word breaker 206 also typically determines the byte offset from the beginning of the document at which the keywords (also referred to as "tokens") are found. For example, word breaker 206 may determine that "innovation" can be found in document 210a at byte offsets 237587100, 446861513 and 687771617, and that "significant" can be found in document 210a at byte offsets 237587778, 687888200, 687888514 and 852531700. This information may be passed back to search engine 204. --, therefor, on line 32 after "210a include "innovation" and "significant"." as continuation of the paragraph.

In column 10, line 65, after "keywords inserted)" insert -- , --.

In column 11, line(s) 14-32, delete "Keyword 802 represents a normalized keyword from the document as determined by word breaker 206. Preferably Keyword 802 is a variable-length binary of maximum length 132 bytes. Keyword preferably is normalized for case and diacritical marks, based on a user's configuration. PropertyId 804 represents the column id of an attribute such as Title, Author, Content, etc. DocIdList 806 is a list of DocIds in which Keyword 802 appears. Preferably, the list of DocIds is compressed bit-wise as a BLOB, a Binary Large Object (i.e., a collection of binary data stored as a single entity). DocCount 808 is the number of documents containing the keyword, DocIdMin 810 is the smallest DocId stored in DocIdList 806. DocIdMax 812 is the largest DocId stored in DocIdList 806. OccListList 814 is a list of occurrence lists, one occurrence list for each DocId in DocIdList 806. OccCountList 816 is the number of occurrences in the corresponding occurrence lists for corresponding DocIds. Index fragments are indexed by a cluster index on (Keyword 802, PropertyId 804 and DocIdMin 810)." and insert -- Keyword 802 represents a normalized keyword from the document as determined by word breaker 206. Preferably Keyword 802 is a variable-length binary of maximum length 132 bytes. Keyword preferably is normalized for case and diacritical marks, based on a user's configuration. PropertyId 804 represents the column id of an attribute such as Title, Author, Content, etc. DocIdList 806 is a list of DocIds in which Keyword 802 appears. Preferably, the list of DocIds is

UNITED STATES PATENT AND TRADEMARK OFFICE
CERTIFICATE OF CORRECTION

PATENT NO. : 7,007,015 B1
APPLICATION NO. : 10/137023
DATED : February 28, 2006
INVENTOR(S) : Tapas K. Nayak It is certified that error appears in the above-identified patent and that said Letters Patent is hereby corrected as shown below:

compressed bit-wise as a BLOB, a Binary Large Object (i.e., a collection of binary data stored as a single entity). DocCount 808 is the number of documents containing the keyword, DocIdMin 810 is the smallest DocId stored in DocIdList 806. DocIdMax 812 is the largest DocId stored in DocIdList 806. OccListList 814 is a list of occurrence lists, one occurrence list for each DocId in DocIdList 806. OccCountList 816 is the number of occurrences in the corresponding occurrence lists for corresponding DocIds. Index fragments are indexed by a cluster index on (Keyword 802, PropertyId 804 and DocIdMin 810). --, therefor, on line 13 after "embodiment of the invention." as continuation of the paragraph.

In column 13, line 20, delete "$I_{n-i}$" and insert -- $I_{n-1}$ --, therefor.

In column 13, line 51, delete "e.g." and insert -- e.g., --, therefor.

Signed and Sealed this

Twenty-ninth Day of September, 2009

David J. Kappos
*Director of the United States Patent and Trademark Office*